United States Patent [19]

Hannibal et al.

[11] Patent Number: 4,461,446

[45] Date of Patent: Jul. 24, 1984

[54] HERMETIC REFRIGERATION COMPRESSOR INSTALLATION AND METHOD

[75] Inventors: Billy B. Hannibal; Kennard L. Wise; Thomas A. Jacoby, all of Tecumseh, Mich.

[73] Assignee: Tecumseh Products Company, Tecumseh, Mich.

[21] Appl. No.: 299,719

[22] Filed: Sep. 8, 1981

[51] Int. Cl.³ .............................................. H01Q 1/12

[52] U.S. Cl. .................................... 248/634; 248/638

[58] Field of Search ............... 248/634, 615, 632, 638, 248/188.8, 677, 635; 267/140, 140.4, 141.5; 417/363

[56] References Cited

U.S. PATENT DOCUMENTS

| | | | |
|---|---|---|---|
| 755,713 | 3/1904 | Shanahan . | |
| 776,251 | 11/1904 | Mendenhall | 248/638 |
| 1,445,617 | 2/1923 | Jehu . | |
| 1,911,804 | 5/1933 | Carpenter | 248/638 X |
| 2,181,570 | 10/1936 | Piron | 248/250 |
| 2,271,746 | 2/1942 | Schmalz | 411/456 X |
| 2,304,036 | 12/1942 | Tegarty | 411/456 X |
| 2,315,387 | 3/1943 | Bambenk et al. . | |
| 2,443,449 | 6/1948 | Fry | 248/615 X |
| 2,881,995 | 4/1959 | Neher | 248/15 |
| 3,025,557 | 3/1962 | Knowlton | 16/42 |
| 3,103,332 | 9/1963 | Waters | 248/615 |
| 3,531,069 | 9/1970 | Dubberley | 248/638 X |
| 3,575,288 | 4/1971 | Brucken | 206/46 |
| 3,744,746 | 7/1973 | Weir et al. | 248/18 |
| 3,957,127 | 5/1976 | Bouchard et al. | 180/64 |
| 4,094,222 | 6/1978 | Lang et al. | 411/15 |
| 4,100,954 | 7/1978 | Müller et al. | 411/15 X |

FOREIGN PATENT DOCUMENTS

| | | | |
|---|---|---|---|
| 1299740 | 12/1972 | United Kingdom | 248/634 |

*Primary Examiner*—Ramon S. Britts
*Assistant Examiner*—Sarah A. Lechok
*Attorney, Agent, or Firm*—Albert L. Jeffers; John F. Hoffman

[57] ABSTRACT

The present invention provides a hermetic refrigeration compressor installation comprising an outer housing containing a refrigeration compressor, a plurality of indentations in the outer housing, a plurality of resilient grommets each having a grommet tip received within a respective one of the indentations, and a bonding between the grommets and the indentations for securing the grommets therein. Further provided is a base separate from the refrigeration compressor and outer housing, and projections on the base for mounting the grommets securely thereon. The method of the present invention comprises forming a plurality of indentations in the outer housing, providing a plurality of resilient grommets each having a grommet tip, adhesively securing each one of the grommet tips in a respective one of the indentations, and connecting the grommets securely to thebase.

14 Claims, 6 Drawing Figures

HERMETIC REFRIGERATION COMPRESSOR INSTALLATION AND METHOD

BACKGROUND OF THE INVENTION

This invention pertains to a compressor installation, and more particularly to a hermetic refrigeration compressor installation and method wherein resilient mounting grommets are provided between the compressor and a base upon which the compressor is installed.

It is well known in the art that hermetic refrigeration compressors for air conditioners, refrigerators and the like generate undesired noise and vibration. Numerous attachments, supports and other like devices have been designed for mounting between a compressor and base to suppress the noise and vibration and absorb shock, but none have been entirely satisfactory without being overly expensive. An example of a recent commonly used mounting device for a hermetic refrigeration compressor comprises a base plate, which is either larger in surface area than the bottom surface of the compressor or has arms extending beyond the bottom surface of the compressor, and to which the compressor is connected. Generally, the base is rectangularly shaped and has a hole in each one of its corners wherein a grommet is forcibly fit in each hole and secured thereto by a lip member integral to the grommet. In order to attach the base to the floor or frame of an appliance, there is provided within each grommet an aperture through which a sleeve is inserted for receiving a nut and bolt assembly. The nut and bolt assembly is then used to secure the compressor and plate to the appliance.

Several problems and disadvantages presently exist with the above base and grommet assembly. The most undesirable problem and disadvantage is that the assembly is costly due to the time and labor required not only to produce, but also to install it. At the manufacturing level, time and labor is spent in producing the base, drilling the required number of holes in the base, and then welding the base to the bottom surface of the compressor, thereby increasing production and labor costs. Thereafter, the installation of the compressor and base within the appliance further adds to the time and labor expended, which again increases total cost. At the installation level, the compressor is required to be inverted to allow hand feeding the grommets in the holes of the base, hand feeding the sleeve within the hole of the grommet, returning the compressor upright for placement on the floor of the appliance, hand feeling the bolt through the sleeve and through a hole in the floor of the appliance, connecting the nut to the bolt and then manually tightening the nut and bolt assembly to secure the compressor and its base to the floor of the appliance. Clearly, this operation is extremely tedious and, more importantly, overly expensive from the standpoint of production time.

In spite of the costly and laborious provision of the base, grommet, sleeve, and nut and bolt assembly of the hermetic refrigeration compressor, the suppression of the noise and vibration generated by the operating compressor is less than optimum.

As may now be seen, the necessary mass production of items such as the base, grommets, sleeves, and nuts and bolts, and their subsequent attachment to the compressor and the floor of the appliance, becomes a substantial fraction of the cost of the appliance in terms of time consumed, materials required, and labor expended.

SUMMARY OF THE INVENTION

The present invention remedies the problems and eliminates the disadvantages of the above prior art by providing an installation which is simple to produce and easy to install. The economical simplicity of manufacturing and the ease of installing the present invention is accomplished by eliminating the base, sleeves, and nuts and bolts, and the labor associated therewith, in installing the compressor within an appliance. In place thereof, the present invention provides in the outer housing of the compressor a plurality of indentations for securing the grommets therein, and on the floor or frame of the appliance a plurality of projections corresponding in number and location to the indentations in the outer housing. The installation of the compressor within the appliance is now only a simple matter of removing the compressor from its container and lowering it on the floor of the appliance such that the projections on the floor of the appliance enter and are secured within the holes in the grommets secured in the indentations of the compressor outer housing.

The placement of the indentations in the outer housing is a matter easily provided during the manufacturing of the outer housing itself. With the indentations previously so provided, it becomes a simple matter at the manufacturing level of the present invention to adhesively secure within the indentations grommets having bores vertically disposed therein. Also, the projections upstanding from the floor or frame of the appliance are easily provided by prestamping the projection out of it during the manufacturing of the floor or frame itself.

In order to ensure that the grommets are mounted securely to the floor or frame of the appliance, the projections may be stamped in the shape of a tang having a plurality of barbs that become securely embedded within the grommet upon the grommet being lowered onto the projection. Alternatively, the projection could be a bullet-shaped or cylindrical pin spot welded to the floor or frame of the appliance whereupon a layer of adhesive would be applied to the surface of the projection to ensure a secure mounting between the grommet and the projection. For compressors having larger motors, the mounting of the grommets could be accomplished by placing them over rectagularly-shaped, prestamped tabs and then passing a locking pin through holes provided in the grommet and tab.

The economical simplicity of the invention directly results in an installation which is easy to accomplish. The installation process now only requires that the compressor be placed on the floor or frame of the appliance so that the projections penetrate the grommet holes. Eliminated is the time-consuming process of manually inverting the compressor, hand-feeding the grommets in the hole of the base, and feeding the sleeve in the hole of the grommet, reinverting the compressor, placing it on the floor or frame of the appliance, hand-feeding the nuts and bolts, and then manually tightening the nuts and bolts to secure the compressor to the floor or frame. This eliminated, time-consuming process aids in reducing the cost of the present invention in contrast to the prior art.

In addition to the elimination of the above parts yielding a reduction in time consumed and labor expended, and therefore cost, the absence of these parts provides an installation that is superior to the prior art in suppressing noise and vibration of the compressor. Again, the invention provides for the securing of the grommets in indentations in the outer housing of the compressor by use of an adhesive or bonding technique, and the mounting of the grommets on the floor of the appliance by inserting tangs or pins in the grommet holes. This structure allows the grommets to maintain their inherent resilience thereby suppressing the noise and vibrations of the compressor unit. Although the technique of adhering or bonding rubber to metal is known, applicants are unaware of the use of such technique for securing mounting grommets directly to the outer housing of a hermetic refrigeration compressor for subsequent mounting of the compressor within an appliance.

In the broader aspect of the present invention, there is provided an improved hermetic refrigeration compressor installation comprising an outer housing containing the refrigeration compressor, a plurality of indentations in the outer housing, a plurality of resilient grommets each having a grommet tip received within a respective one of the indentations, and adhesive means for securing the grommets in the indentations. Further provided, is a base separate from the refrigeration compressor and means for mounting securely the grommets on the outer housing to the base. The method of the invention comprises presenting an outer housing containing the refrigeration compressor, providing a plurality of indentations in the outer housing, supplying a plurality of resilient grommets each of which has a grommet tip, positioning each one of the grommet tips in a respective one of the indentations, adhesively securing the grommets in the indentations, furnishing a base separate from the outer housing, and mounting the grommets securely to the base.

It is therefore an object of the present invention to provide an improved hermetic refrigeration compressor installation which is inexpensive to produce by eliminating bases, sleeves, nuts and bolts, and like materials required by the prior art, and in place thereof, providing a plurality of indentations in the outer housing for adhesively or bondingly securing grommets therein and a plurality of projections upstanding from the floor or frame of the appliance for mounting grommets thereon.

It is another object of the present invention to provide an improved hermetic refrigeration compressor installation more easily installed by eliminating the need of hand-feeding grommets, sleeves, nuts and bolts, and like devices required by the prior art for securing the compressor to the floor or frame of an appliance, and in place thereof permitting the installation of the compressor to be made by merely pushing the compressor over the projections on the floor or frame of the appliance.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A SPECIFIC EMBODIMENT

Figure 1:
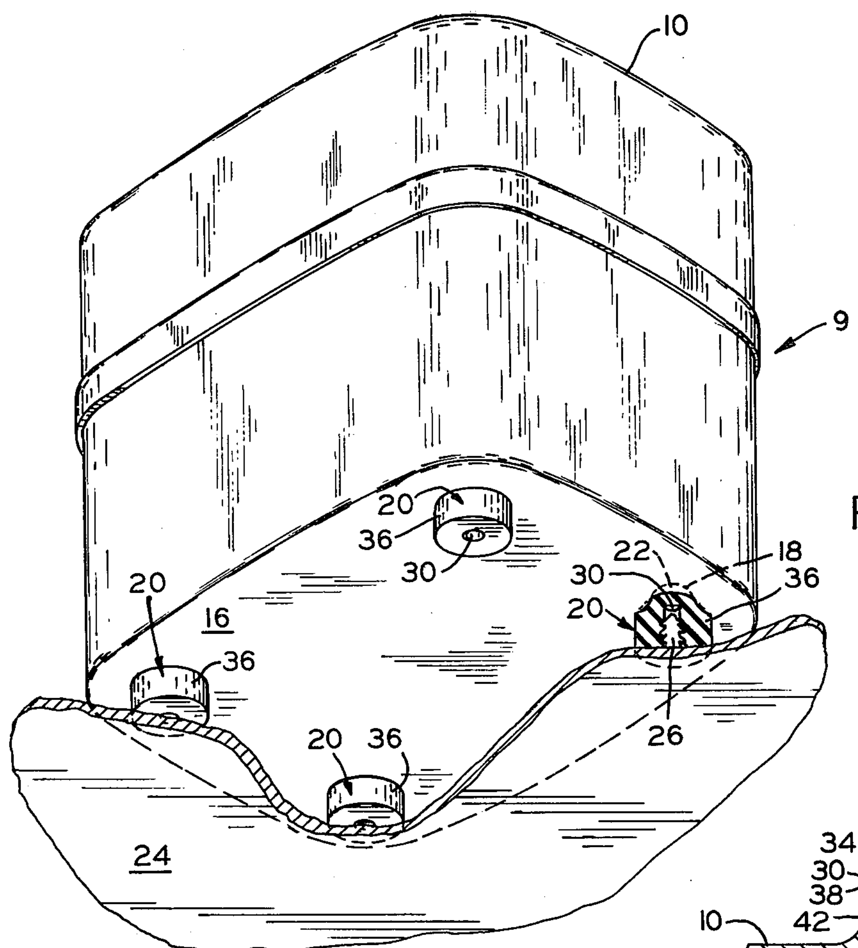
FIG. 1 is a partially cut away bottom perspective view of one embodiment of the invention.

Referring to FIG. 1, a conventional hermetic refrigeration compressor is depicted. Typical of hermetic refrigeration compressor unit 9 are those manufactured by Tecumseh Products Company of Tecumeseh, Mich. and which comprise a motor driven single or multi-cylinder compressor hermetically sealed within an outer housing 10 having a lower surface 16. The present invention comprises generally a plurality of indentations 18 on lower surface 16, a plurality of grommets 20 each having a grommet tip 22 secured in a respective one of the indentations 18, a base 24 separate from outer housing 10 and upon which hermetic refrigeration compressor unit 9 is to be installed, and a plurality of projections such as tang 26 upstanding from base 24. In particular, the present invention is viewed as being primarily associated with compressor units designed for refrigerators, air conditioners, freezers, and like appliances, and whose purpose is to cushion shock and attenuate noise and vibration caused by the compressor unit in opration.

Figure 2:
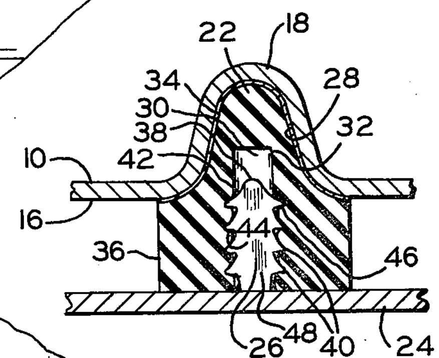
FIG. 2 is a cut away perspective view of one of the grommets of FIG. 1.

Referring in detail to FIGS. 1 and 2, a specific embodiment of the present invention is depicted. The number of grommets in any embodiment of the present invention may vary from three or more depending on specific installation requirements. Since each grommet is identical and identically installed, a description of a single grommet and installation will therefore suffice for all such grommets and grommet installations. As earlier described, lower surface 16 has a plurality of indentations 18 therein and each indentation 18 has an indentation inner surface 28. Also, in addition to grommet 20 having a grommet tip 22, it further has a bore 30 generally vertically disposed therein with a bore surface 32. Grommet 20 may be made of a resilient material such as rubber or any similar type material having a resilient nature.

A feature unique to the present invention is that grommet 20 is directly secured to lower surface 16 by a bond layer 34. Bond layer 34 may be an appropriate adhesive material such as LOCTITE Super Bonder® 495 or other means capable of securing rubber or a like material to a metal surface. It is important to the present invention that grommet 20 have a portion such as base portion 36 which extends beyond the surface to which it is bondingly attached. Grommet 20 is further secured to base 24 by drawing grommet 20 over tang 26 such that tang 26 becomes secured within bore 30 of grommet 20. Tang 26, which is secured to base 24 by spot welding or other means, is planar and has a tang end 38 on its upright remote portion and a plurality of barbs 40. Each barb 40 is so formed upon tang 26 such that it has a top surface 42 which slopes downward from tang end 38 and an undersurface 44 angularly disposed on tang 26 such that a point 46 is formed at the juncture of top surface 42 and undersurface 44. Tang 26 may further have about its longitudinal axis a plurality of additional planes 48 (not shown) which have a plurality of barbs 40 vertically disposed thereon. Upon placement of grommet 20 over tang 26 such that tang 26 enters bore 30, the sloping barb top surfaces 42 cause bore surface 32 to expand outwardly to accommodate bars 40. Upon full extension of tang 26 within bore 30 of grommet 20, barb points 46 become sharply embedded within the surface 32 of the bore 30 of grommet 20 thereby securely attaching grommet 20 to base 24.

If the location of hermetic refrigeration compressor unit 9 so dictates, grommets 20 may first be securely attached to tangs 26, and an adhesive layer than applied to grommet tips 22, and hermetic refrigeration compressor unit 9 may then be installed by lowering outer housing 10 onto base 24 such that grommet tips 22 are each received within a respective one of indentations 18 in lower surface 16.

Regardless of the sequence of the securing of grommets 20, the present invention provides a structural installation of a hermetic refrigeration compressor unit 9 upon a base 24 of an appliance which improves attenuation of noise and vibration caused by the operating compressor. Furthermore, the present invention allows for a more simple and more economical method of installing a hermetic refrigeration compressor unit 9 upon a base 24 within an appliance. Hereafter, such installation is accomplished merely by removing hermetic refrigeration compressor unit 9 from its shipping container and placing it upon base 24 such that grommets 20 receive a respective tang 26 within bore 30. The present invention therefore dispenses with the requirements of inverting the compressor, hand feeding grommets, hand feeding sleeves, reinverting the compressor upright, and then manually attaching the compressor to the base with a nut and bolt assembly.

Figure 3:
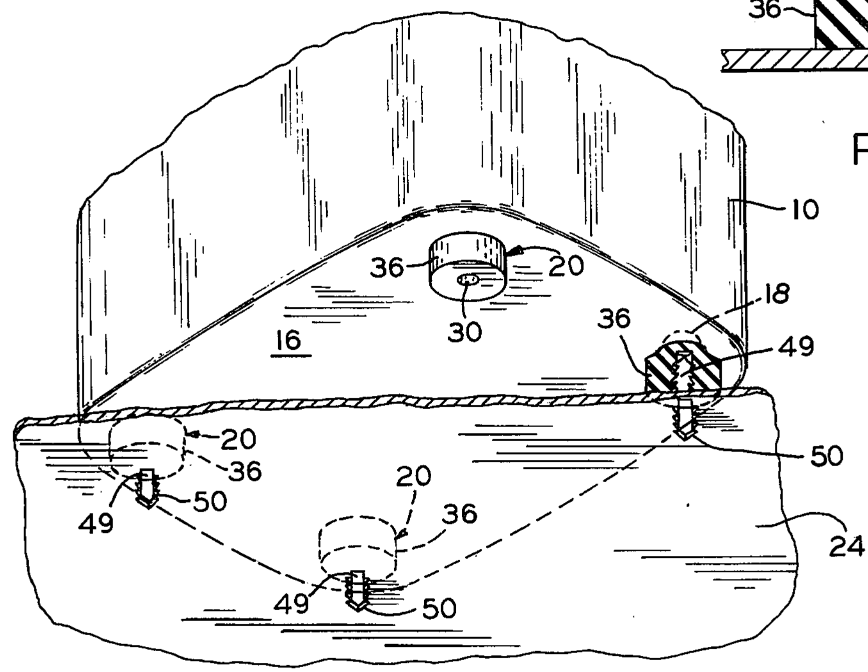
FIG. 3 is a partially cut away bottom perspective view illustrating a second embodiment of the invention with the projection stamped out of the base.

In reference to FIG. 3, a second embodiment of the above invention is illustrated, and identical reference numerals have been used where appropriate. The primary difference between the two embodiments is the placement of tangs 49 upon base 24. Above, tangs 26 were secured upright on base 24 by spot welding or a like manner of attachment. This second embodiment of the present invention eliminates the need of any spot welding or any other manner of securing tangs 49 to base 24 by having tangs 49 stamped-out of base 24 upon manufacturing base 24. In this embodiment, base 24 will have openings 50 in the shape of tangs 49 upon tangs 49 being stamped-out from base 24. Since tangs 49 are stamped out of base 24, they will also have only one plane of barbs 40 vertically disposed thereon, and in most aspects this embodiment is identical to the first embodiment above.

Figure 4:
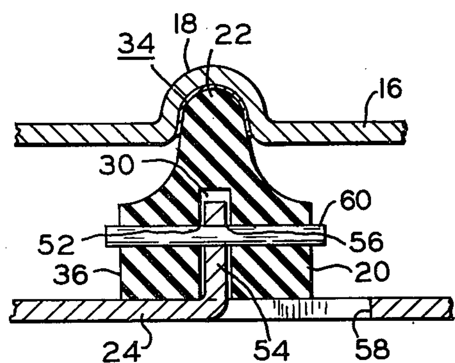
FIG. 4 is a sectional view of a third embodiment of the invention.
Figure 5:
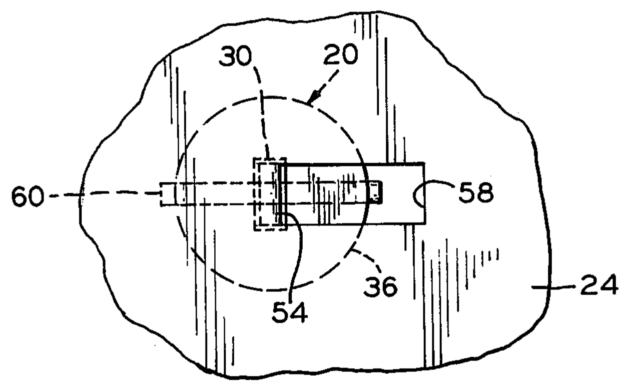
FIG. 5 is a bottom view of the embodiment of FIG. 4.

Now referring to FIGS. 4 and 5, a third embodiment of the present invention is shown. The features differing in this third embodiment as compared to the above two embodiments is in the attachment of grommet 20 to base 24. Grommet 20 now further has aperture 52 generally horizontally disposed therethrough and intersecting with bore 30 of grommet 20. The projection upstanding from base 24 is tab 54, which is rectangularly-shaped and stamped out of base 24 leaving an opening 58 in base 24. Alternately, tab 54 may be spot welded to base 24 or secured thereto in any other like manner. Tab 54 further has opening 56 generally horiozontally disposed therethrough. Upon placement of grommet 20 upon base 24, tab 54 is received within bore 30 such that opening 56 in tab 54 and aperture 52 of grommet 20 are horizontally aligned thereby allowing reception of locking pin 60, such as a cotter pin, therethrough for securing grommet 20 to base 24. The method of installing this particular embodiment of the present invention is similar to the above embodiments except for the additional requirement of inserting locking pin 60. This specific embodiment may be more desirable in installing larger compressor units requiring more secure attachment to the base of the appliance.

Figure 6:
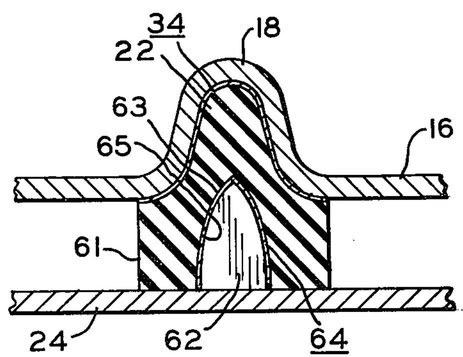
FIG. 6 is a sectional view of a fourth embodiment of the invention.

Referring now to FIG. 6, a fourth embodiment of the present invention is illustrated. Again, the primary differing feature of this embodiment is in the attachment of grommet 61 to base 24. Provided on base 24 is a pin 62 having tapering sides thereby giving pin 62 a bullet-shaped appearance, alternaely, pin 62 could be cylindrical in shape without tapering sides. Bore 63 of grommet 20 is provided with a bore surface 65 similar in shape to the outer surface of pin 62 to allow for a close fit of pin 62 within bore 63. Prior to placing grommet 61 upon base 24, an adhesive layer 64 is applied to pin 62 or bore surface 65 of grommet 61. Thereafter, grommet 61 is placed upon base 24 such that pin 62 is received within bore 63 and adhesively secured thereto. A suitable adhesive is LOCTITE SUPER BONDER ® 495.

As described above, the present invention provides an improvement in the attenuation of noise and vibration caused by the compressor in operation. Furthermore, the method of the present invention provides a more simple and more economical installation of a hermetic compressor unit within an appliance. The installer has now only to remove the hermetic refrigeration compressor unit from its shipping container and place it directly upon the base such that each grommet receives a respective projection therein. Eliminated is the need to invert the compressor, hand feed the grommets within the brackets, hand feed sleeves within the grommets, reinverting the compressor upright, lowering the compressor upon the appliance base, and then manually securing the unit to the base with nuts and bolts. Consequently, the present invention reduces the time and labor expended in installation, and therefore reduces total cost for both the producer and the consumer.

While this present invention has been described as having specific embodiments, it will be understood that it is capable of further modifications. This application is therefore intended to cover any variations, uses, or adaptations of the invention following the general principles thereof and including such departures from the present disclosure as come within known or customary practice in the art to which the invention pertains and fall within the limits of the appended claims.

What is claimed is:

1. A hermetic refrigeration compressor installation comprising:

an outer housing containing a refrigeration compressor unit and hermetically sealing the unit from the ambient environment, a plurality of indentations in an outer surface of said outer housing, a plurality of generally elastic grommets each having a bore therein, each of said grommets having a grommet tip adhesively secured within its corresponding indentation, and a base separate from said housing and having a plurality of projections, each of said projections being positioned on the base so as to be in general axial alignment with the bore of its corresponding grommet, said projection being received and secured within the bore so that the outer housing is resiliently mounted to the base.

2. The hermetic refrigeration compressor installation of claim 1 wherein the end portions of said grommets which are adjacent to said base extend beyond said outer housing so that the outer surface is spaced apart from the base.

3. The hermetic refrigeration compressor installation of claim 1 wherein said projections are tangs each having a plurality of barbs thereon, said barbs being embedded in said grommets.

4. The hermetic refrigeration compressor installation of claim 3 wherein said tags are stamped out of said base.

5. The hermetic refrigeration compressor installation of claim 1 wherein said projections are pins mounted securely within said grommets by an adhesive layer between said pins and said grommets.

6. The hermetic refrigeration compressor installation of claim 1 wherein said projections are tabs each having an opening generally horizontally disposed therethrough, said grommets each have an aperture therethrough, said aperture being generally normally disposed to said bore, and said tabs are mounted securely to said grommets by locking pins received through said openings and said apertures.

7. The hermetic refrigeration compressor installation of claim 6 wherein said tabs are stamped out of said base.

8. The hermetic refrigeration compressor installation of claim 1 wherein the base includes a generally planar surface disposed in a generally parallel fashion with respect to said outer surface.

9. The hermetic refrigeration compressor installation of claim 1 wherein said indentations form a continuous surface recessed away from said base.

10. A method of resiliently mounting to a base a hermetic refrigeration compressor having a hermetically sealed oiuter housing, said method comprising:

forming a plurality of indentations in an outer surface of the housing, providing a plurality of elastic grommets each having a grommet tip, applying an adhesive to the surfaces of the indentations, positioning each one of the grommet tips in its corresponding one of the indentations, and connecting the grommets securely to the base.

11. The method of claim 10 wherein each of the grommets further includes a bore generally axially therein.

12. The method of claim 10 including stamping out of the base a plurality of projections upstanding from the base and embedding the projections in the grommets by axial movement of the base relative to the outer surface.

13. The method of claim 12 wherein the step of connecting the grommets securely to the base further includes placing the outer housing apart from the base such that each one of the grommet bores is axially aligned directly above a respective one of the projections, and axially drawing the outer housing against the base whereby the projections are received within the bores.

14. A housing for hermetically sealing a refrigeration compressor and being mountable to a generally planar surface of a separate base wherein the planar surface has a plurality of projections, the housing comprising:

a generally planar outer surface disposed so as to be generally parallel with respect to the base planar surface and having a plurality of continuous identations formed therein, each of said indentions being recessed away from the base planar surface; and a plurality of elastic grommets, each of said grommets being adhesively secured within its corresponding said indention, each of said elastic grommets having a central bore in which a corresponding one of said projections is received so as to resiliently mount the housing to the separate base.

* * * * *

UNITED STATES PATENT AND TRADEMARK OFFICE
CERTIFICATE OF CORRECTION

PATENT NO. : 4,461,446

DATED : July 24, 1984

INVENTOR(S) : Billy B. Hannibal, Kennard L. Wise, Thomas A. Jacoby

It is certified that error appears in the above-identified patent and that said Letters Patent is hereby corrected as shown below:

Col. 1, line 61, change "of" to --to--.
Col. 3, line 15, change "aspect" to --aspects--.
Col. 4, line 10, insert --8-- after "compressor";
lines 27-28, change "oprations" to --operations--.
Col. 6, line 10, change "alternaely" to --alternately--.
Col. 5, line 9, change "than" to --then--.
Claim 4, col. 7, line 2, change "tags" to --tangs--.
Claim 10, col. 7, line 3, change "oiuter" to --outer--.
Claim 14, col. 8, lines 30-31, change "identations" to --indentations--;
line 31, change "indentions" to --indentations--;
line 35, change "indentions" to --indentations--.

Signed and Sealed this

*Second* Day of *April 1985*

[SEAL]

*Attest:*

DONALD J. QUIGG

*Attesting Officer* *Acting Commissioner of Patents and Trademarks*